United States Patent [19]

Winnale et al.

[11] 4,310,179
[45] Jan. 12, 1982

[54] THREE-POINT PASSIVE OCCUPANT RESTRAINT SYSTEM

[75] Inventors: James A. Winnale, Warren; Lloyd W. Rogers, Jr., Utica; Edward E. Compeau, Fraser; Albert E. Billis, Rochester, all of Mich.

[73] Assignee: General Motors Corporation, Detroit, Mich.

[21] Appl. No.: 77,142

[22] Filed: Sep. 19, 1979

[51] Int. Cl.³ .............................................. B60R 21/10
[52] U.S. Cl. ..................................... 280/803; 297/469
[58] Field of Search ............... 280/802, 803, 805, 806, 280/807, 808; 297/469, 468, 474, 475

[56] References Cited

U.S. PATENT DOCUMENTS

| 3,462,192 | 8/1969 | Fredericks | 297/481 |
|---|---|---|---|
| 3,770,294 | 11/1973 | Hammer | 280/803 |
| 3,856,327 | 12/1974 | Otani | 280/803 |
| 3,993,328 | 11/1976 | Henderson | 280/807 |
| 4,053,175 | 10/1977 | Kato et al. | 280/803 |
| 4,175,773 | 11/1979 | Miller | 280/803 |
| 4,189,170 | 2/1980 | Tanaka | 280/802 |

OTHER PUBLICATIONS

NHTSA Docket No. 72-23, Notice 04, Seat Belt Assembly Anchorages, Federal Register, vol. 43, No. 102, May 25, 1978.
Volkswagen Passive Occupant Protection, Sieffert, Body Engineering Journal, Fall 1978.
Passive and Semi-Passive Seat Belts for Increased Occupant Safety, Johannessen and Yates, May 1972, SAE Paper 720438.
Means for Effective Improvement of the Three-Point Seat Belt in Frontal Crashes, Svensson, Proceedings of Twenty-Second Stapp Car Crash Conference, Oct. 1978, SAE Publication.

Primary Examiner—John A. Pekar
Attorney, Agent, or Firm—Charles E. Leahy

[57] ABSTRACT

A three-point passive seat belt system includes a continuous-loop restraint belt having upper and lower ends attached to the door. A control belt has its outboard end attached to a junction ring which encircles the continuous-loop belt to define lap belt and shoulder belt portions. The inboard end of the control belt is mounted inboard the seat by a retractor reel which winds the control belt. When the door is closed the retractor winds the control belt to establish the lap and shoulder belt portions respectively across the lower and upper torso of the occupant. The outboard end of the lap belt portion is attached to the door by a resilient anchor strap forward of the MVSS 210 specified mounting location. The limited forward excursion of the lower torso permitted by the combined effects of the forward belt mounting, the yielding and pivoting of the resilient anchor strap under occupant restraint load, and the spool-down of belt on the reel under occupant restraint load cooperates with the simultaneous limited forward excursion of the upper torso to maintain the occupant in a vertically upright or somewhat rearward reclining position to limit the forward rotational excursion of the head.

3 Claims, 8 Drawing Figures

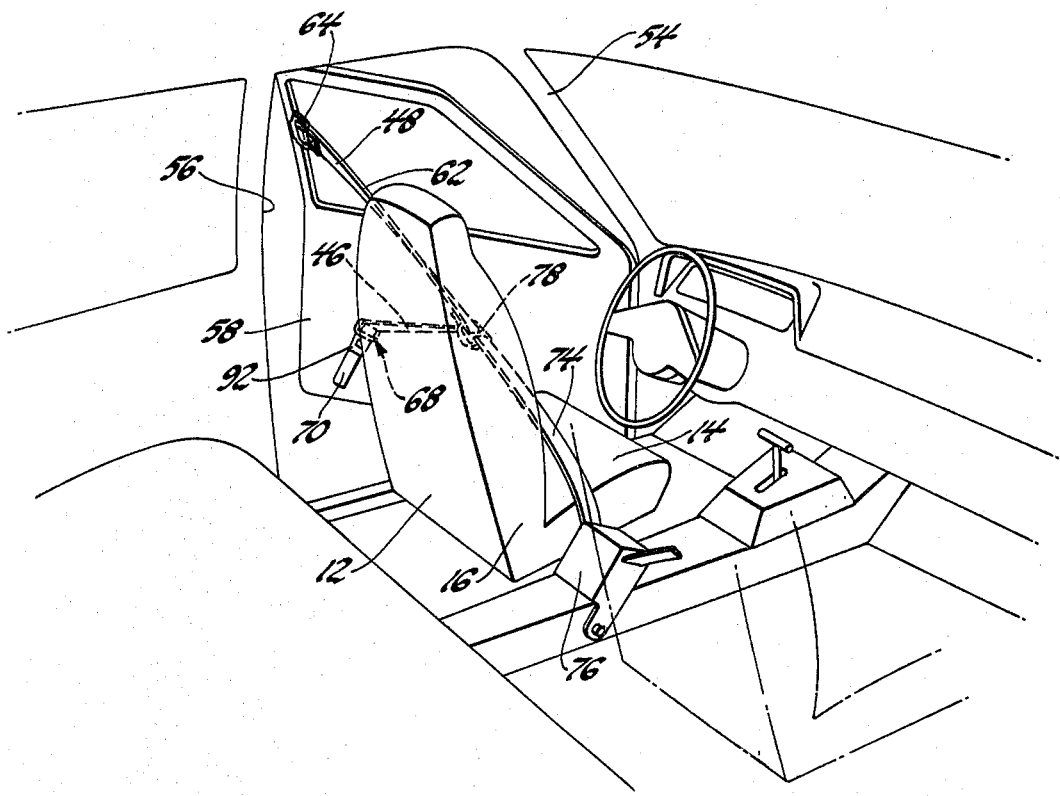
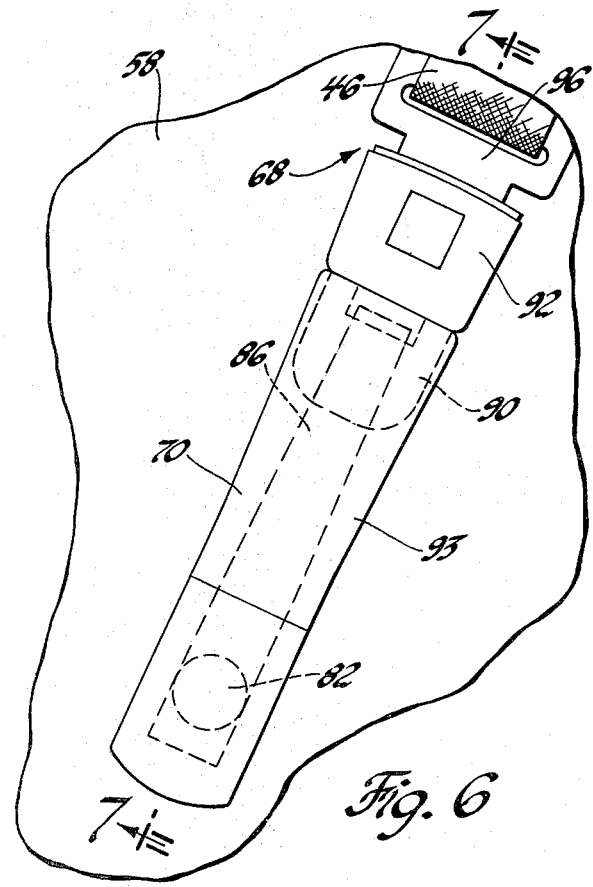
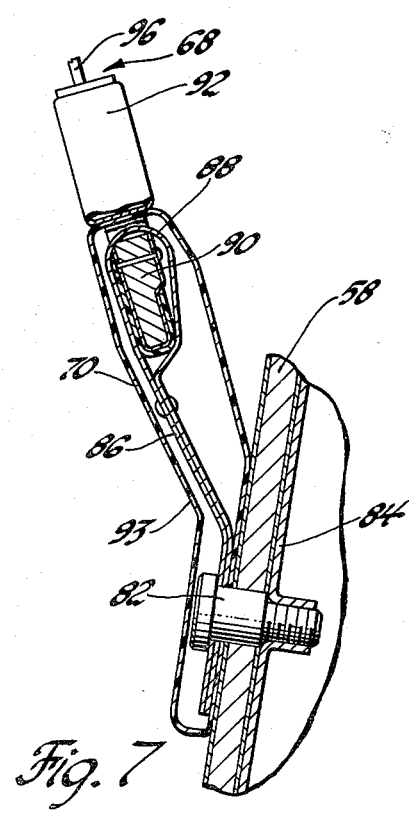

THREE-POINT PASSIVE OCCUPANT RESTRAINT SYSTEM

The invention relates to a passive seat belt system and more particularly provides a new and improved three-point door connected lap and shoulder belt system.

BACKGROUND OF THE INVENTION

It is well known that effective restraint of a seated vehicle occupant is provided by a lap belt disposed across the lower torso and a shoulder belt disposed diagonally across the upper torso. The lap belt ends are mounted on the vehicle body respectively inboard and outboard the seat to establish the lap belt in a restraining position across the occupant lower torso. The shoulder belt has one end mounted at a low elevation at one side of the seating position and the other end mounted at a high elevation on the opposite side of the seating position to establish the shoulder belt in a diagonal restraining position across the chest and over the shoulder of the seated occupant.

It is generally recognized that the deceleration loads imposed upon the occupant are best managed by restraining the seated occupant within the seat in a manner by which the occupant is both decelerated in unison with the crush of the vehicle body and also decelerated through the additional space available within the passenger compartment while at the same time minimizing interference with the steering wheel or instrument panel.

One well known type of occupant restraint system is the so-called active three-point seat belt system in which the ends of the lap and shoulder belts are mounted on the vehicle body outboard the seat and carry a latch plate which is manually engageable within a buckle mounted on the vehicle body inboard of the seat to retain the lap and shoulder belts in restraining positions respectively across the upper and lower torsos of the occupant. A retractor is associated with at least one of the belt ends. It is characteristic of the aforedescribed active belt system that the retractor removes the slack from the lap belt with the result that the lower torso remains relatively fixed against forward excursion during rapid vehicle deceleration. On the other hand, the upper torso is pivoted forwardly into the shoulder belt and away from the seat back to a forwardly inclined attitude with the head rotated still further forwardly as seen in FIG. 2. The aforedescribed three-point active belt systems have been in use for many years and have been found to provide effective occupant restraint performance.

Another type of occupant restraint is a passive restraint comprised of the combination of a diagonal shoulder belt and a knee cushion. The shoulder belt has an outboard end mounted on the upper rear corner of the door and the inboard end mounted at a low elevation inboard the seat. A retractor winds one end of the belt when the door closes to establish the shoulder belt in restraining position about the upper torso. A knee cushion is mounted on the instrument panel generally forward of the occupant knees for restraint of the lower torso. This type of passive restraint operates on a different theory from the active lap and shoulder belt restraint in that during vehicle deceleration the lower torso moves substantially forward relative the seat until the knees engage the knee cushion. The spool-down effect or tightening of the considerable length of shoulder belt wound upon the retractor permits limited and controlled forward excursion of the upper torso away from the seat in unison with the forward excursion of the lower torso into restraining engagement with the knee cushion. The resultant kinematics of the occupant are comprised of a more generally vertically upright or slightly reclining position shown in FIG. 3 as opposed to the forwardly pivoted upper torso position of FIG. 2 which characterizes the active three-point system. The more upright occupant position of FIG. 3 provides the desirable effect of limiting forward rotation of the head. It is recognized as advantageous in the aforedescribed passive restraint to provide an active lap belt for optimizing the restraint effectiveness in those instances where the vehicle deceleration is not purely in the head-on direction. To this end, it is known to provide a folded over segment of the lap belt having tearaway stitches which will yield at a predetermined level of load to permit the desired forward excursion of the lower torso into engagement with the knee cushion.

Another type of passive occupant restraint is provided by mounting the outboard ends of both the lap and shoulder belts on the door. The inboard belt ends are mounted inboard the seating position. A retractor is provided for winding the belts when the door closes to establish both the lap and the shoulder belts in their respective restraining positions about the occupant.

One variable which is known to influence the restraining effectiveness of both lap and shoulder belts is the anchorage locations of the belt ends on the vehicle body. With regard to arrangement of the lap belt in belt systems of both the active and passive types, it is known that providing the lap belt anchorage at a relatively high elevation rearward the occupant causes the belt to wrap in a generally horizontal attitude about the occupant and is very effective insofar as limiting the forward excursion of the occupant relative the seat but may result in a so-called submarining condition in which the belt rides above the iliac crests of the pelvis and assumes a restraining position overlying the soft abdominal area of the occupant. On the other hand, it is recognized that anchorage of the lap belt ends at a lower elevation relatively more forward causes the belt to assume a more vertical attitude passing over the thighs and effectively overcomes the submarining condition. However, it is reported that a lessened restraining effect may result from this forward location of the lap belt anchorages because of increased forward excursion of the seat occupant.

As a consequence of the conflicting objectives of preventing submarining beneath the belt and limiting forward excursion of the occupant, it has been recognized that the lap belt ends should be anchored in a zone which is not so high and rearward as to cause submarining and yet not so low and forward as to permit forward occupant excursion. To this end, Motor Vehicle Safety Standard, MVSS 210, promulgated by the United States National Highway Traffic Safety Administration specifies that the mounting locations of the lap and shoulder belt ends fall within the permissible range shown by the cross-hatched areas in the drawings.

It is known that the mounting locations specified by MVSS 210 may be inapplicable to passive seat belt systems in which it is necessary to mount the outboard shoulder belt end on the window frame of the door so that the swing geometry of the door automatically moves the shoulder belt between the access and restraining positions. As an example, FIG. 8 shows the outline of the door of a 4-door Chevrolet Chevette and it is noted that the trailing edge of the door adjacent the occupant shoulder falls very close to the forwardmost limit of the acceptable range of anchorage locations. Accordingly, Applicants' assignee petitioned for amendment of MVSS 210 in order to delete the forward limitation on the shoulder belt anchor locations. In consequence of that petition, MVSS 210 was amended to exempt passive seat belt systems from the specified location requirements.

Referring again to FIG. 8, it is noted that the forwardmost limit of the acceptable range for mounting of the lap belt falls well forwardly of the trailing edge of the door, and accordingly does not present any complication with respect to mounting the outboard end of the passive lap belt within the acceptable range of anchorage locations specified by the MVSS 210.

It is also recognized in the prior art that inertia locking seat belt retractors experience some delay in fixing the length of the belt due to the so-called spool down effect caused by the tightening of several layers of belt wound on the reel. It has been recognized that this lockup delay is largest in passive door connected belt systems because a relatively large amount of belt is wound upon the retractor reel when closing movement of the door establishes the belts in the restraining position. The prior art has proposed that this problem of lockup delay be solved by providing a belt clamping device after the belt exits the reel to clamp the belt at a fixed length. Various piston operated belt tensioning devices have also been proposed to forcibly rotate the reel in the belt winding direction.

SUMMARY OF THE INVENTION

According to the present invention, a new and improved three-point door connected passive lap and shoulder belt system is provided wherein mounting of the outboard lap belt end on the door forwardly of the limit specified by MVSS 210 unexpectedly improves the restraint effectiveness by simulating the occupant kinematics of the passive shoulder belt and knee cushion restraint system.

Furthermore, the present invention provides a new and improved three-point door connected passive lap and shoulder belt system wherein the spool-down effect of the belt portion wound upon the retractor reel introduces an amount of slack into the belt system which provides limited forward excursion of the occupant in a manner which optimizes restraint performance by decelerating the occupant through the space available within the passenger compartment while at the same time limiting forward head rotation and excursion.

A three-point passive seat belt system according to the invention includes a continuous-loop restraint belt having a lower end attached to the lower rear corner of the door and an upper end attached to the upper rear corner of the door. A control belt has its outboard end attached to a junction ring which encircles the continuous-loop belt to divide the continuous-loop belt into lap belt and shoulder belt portions. The inboard end of the control belt is mounted on the vehicle body inboard the seat by a vehicle sensitive inertia locking retractor having a reel upon which the control belt is wound. When the door is closed the retractor winds the control belt to establish the junction ring generally adjacent the inboard occupant hip and thereby divide the continuous-loop belt into lap and shoulder belt portions disposed respectively across the lower and upper torso of the occupant. When the door is opened, the outward and forward swing geometry of the door moves the outboard ends of the lap and shoulder belts generally outwardly and forwardly of the occupant as permitted by unwinding of the control belt from the retractor to facilitate occupant ingress and egress. The outboard end of the lap belt portion is attached to the door substantially forward of the mounting locations specified by MVSS 210. Furthermore, the outboard lap belt mounting is provided by a resilient yieldable anchor strap having its lower end attached to the door by an anchor bolt and its upper end attached to the lap belt. The resilient anchor strap resists the inboard pulling tension of the retractor and stands angularly adjacent the door to dispose the outboard lap belt end well above and somewhat forwardly from the anchor bolt location in a manner which facilitates occupant ingress and egress by establishing the outboard lap belt end substantially above and forward that location which would result from a direct connection of the lap belt outer end to the anchor bolt location. Upon imposition of occupant restraining load during vehicle deceleration, the substantial length of control belt wound upon the reel spools down and introduces some additional slack at the inboard ends of both the shoulder belt and lap belt. The occupant restraint load also causes the resilient anchor strap to yield inwardly and pivot forwardly, thus having the effect of introducing some additional slack into the outboard portion of the lap belt. The resilient anchor strap is configured to lengthen the lap belt by an amount corresponding generally to the increase in lap belt length arising from the spool-down of the control belt on the retractor reel. Accordingly, the matched increase in length of the inboard and outboard portions of the lap belt ensure simultaneous and uniform excursion of both hips in the forward direction. The limited forward excursion of the lower torso permitted by the combined effects of the forward belt mounting, the yielding and pivoting of the resilient anchor strap, the reel spool-down effect, and the simultaneous limited forward excursion of the upper torso maintain the occupant in a vertically upright or somewhat rearward reclining position to limit the forward rotational excursion of the head.

Accordingly, one object, feature and advantage of the invention resides in the provision of a three-point passive lap and shoulder belt system wherein a relatively forward anchorage of the outboard lap belt end on the door permits limited forward excursion of the lower torso in unison with limited forward excursion of the upper torso whereby the restrained position of the occupant is generally vertically upright and/or rearwardly inclined to thereby limit forward rotation and excursion of the head.

Another object, feature and advantage of the invention resides in the generally forward location of the anchor bolt for the outboard lap belt end and a resilient anchor strap interposed between the anchor bolt and the lap belt end to establish the outboard belt end in a generally raised position facilitating occupant ingress and egress, said strap being yieldable under occupant restraint load to effectively introduce additional length into the lap belt, thereby permitting limited forward excursion of the occupant lower torso relative the seat.

A still further object, feature and advantage of the invention resides in the provision of a forwardly located outboard lap belt mounting adapted to permit limited forward movement of the outboard occupant hip generally equal to the limited forward movement of the inboard hip permitted by lengthening of the inboard belt end resulting from spooling down of the inboard belt end on the reel under imposition of occupant restraint load.

BRIEF DESCRIPTION OF THE DRAWINGS

These and other objects, features and advantages of the invention will become apparent upon consideration of the specification and the appended drawings in which:

FIG. 5 is a perspective view of the vehicle passenger compartment showing the three-point passive lap and shoulder belt of the invention;

FIG. 6 is an enlarged fragmentary view of FIG. 5 showing the resilient yieldable strap connecting the outboard lap belt end portion to the vehicle door;

FIG. 7 is a sectional view through the yieldable strap taken in the direction of arrows 7—7 of FIG. 6.

DESCRIPTION OF THE PREFERRED EMBODIMENT

Figure 1:
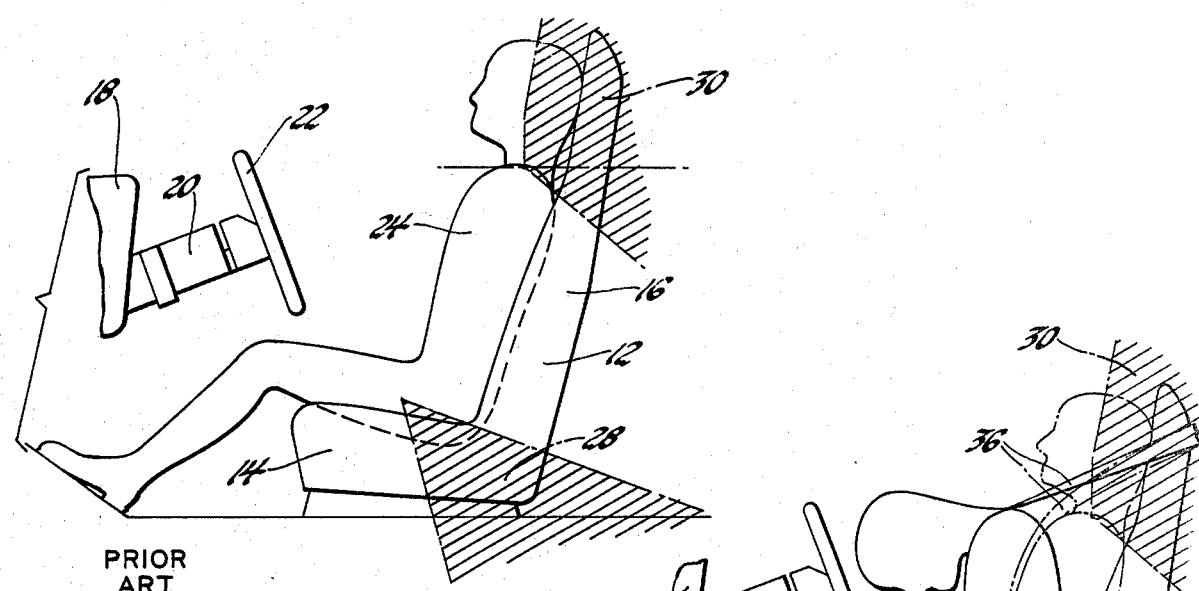
FIG. 1 is a side elevation view of a vehicle occupant compartment showing the normal seating position of an occupant therein and having the permissible anchorage zones of the lap and shoulder belt ends designated by cross-hatching.

Referring to FIG. 1, there is shown a vehicle occupant passenger compartment having a seat 12 comprised of a seat bottom 14 and a seat back 16. An instrument panel 18 and a steering column 20 support a steering wheel 22 forwardly of the occupant seat. An occupant 24 is shown seated on the seat 12. The cross-hatched zone 28 represents the acceptable range specified by Motor Vehicle Safety Standard No. 210 for the location of the lap belt anchorage and the anchorage of the shoulder belt lower end. The cross-hatch zone 30 indicates the acceptable range specified by MVSS 210 for mounting of the upper shoulder belt end. The pertinent part of MVSS 210 which locates the mounting zone 28 provides: "In an installation in which the seat belt does not bear upon the seat frame, a line from the seating reference point to the nearest contact point of the belt with the hardware attaching it to the anchorage for a non-adjustable seat, or from a point 2.50 inches forward of and 0.375 inches above the seating reference point to the nearest contact point of the belt with the hardware attaching it to the anchorage for an adjustable seat in its rearmost position, shall extend forward from the anchorage at an angle with the horizontal of not less than 20° and not more than 75°." The seating reference point referred to in MVSS 210 is a unique design point, specifically known as the H-point, with the seat adjusted to the rearmost normal driving and riding position. The H-point is the point which simulates the actual pivot center between the human torso and thigh. The location of the seating reference point in a particular vehicle seat construction is determined by use of a three dimensional H-point machine having a seat back pan and seat bottom pan representative of the body contours of an adult male. Weights are placed on the H-point machine to provide penetration of the seat cushions equivalent to that of a 167 pound (76 kilogram) male. A two dimensional drafting template corresponding to the profile of the three dimensional H-point machine is used during the conception, engineering and development stages of a new vehicle and is used to display data obtained from checks of the vehicle made with the three dimensional H-point machine. This system of dimensioning a vehicle passenger compartment is described in SAE Standard J826b "Devices For Use In Defining And Measuring Vehicle Seating Accommodation" and is used by all vehicle manufacturers for certifying vehicles for compliance with the Federal Motor Vehicle Safety Standards.

It will be understood that the seat 12 is conventionally adjustable fore and aft to suit the size of the particular occupant.

Figure 2:
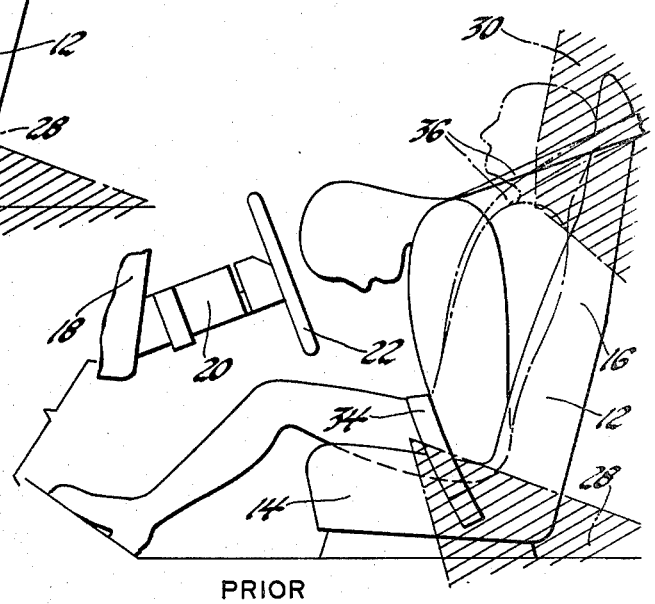
FIG. 2 shows a three-point active lap and shoulder belt with the normal seating position indicated in phantom line and the restrained position of the occupant under vehicle deceleration condition shown in solid lines.

Referring to FIG. 2, there is shown a prior art active lap and shoulder belt system associated with the seat 12. The ends of the lap belt 34 and shoulder belt 36 are mounted within the acceptable zones 28 and 30 specified by MVSS 210. Upon rapid vehicle deceleration the lap belt restrains the lower torso against forward movement. The momentum of the occupant causes the upper torso to pivot forwardly away from the seat back 16 from the phantom line indicated normal seating position to the solid line indicated position in which the shoulder belt restrains forward movement. The occupant head rotates forward and downward toward the steering wheel 22. Active lap and shoulder belt restraint systems are known to meet all applicable safety standards and to provide effective restraint of the seated occupant.

Figure 3:
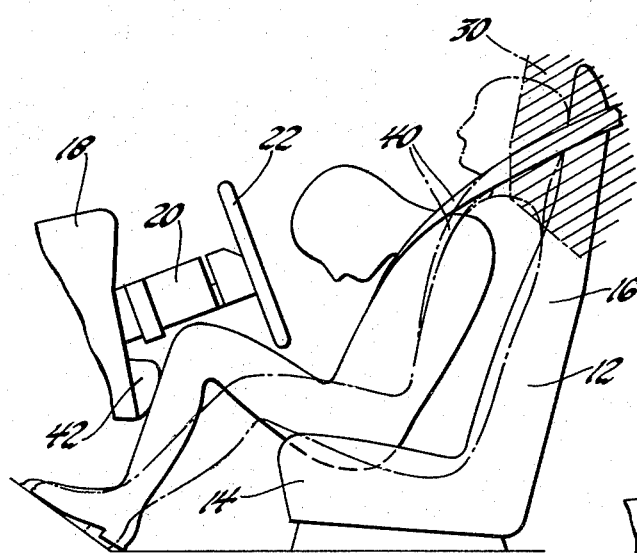
FIG. 3 shows a passive shoulder belt and knee cushion associated with the vehicle body, the normal occupant seating position shown in phantom line, and the restrained position under vehicle deceleration condition shown in solid lines.

Referring to FIG. 3, there is shown a passive occupant restraint associated with the seat 16. The passive restraint includes a shoulder belt 40 and a knee cushion 42. The outboard end of the shoulder belt 40 is connected to the vehicle door so that closing movement of the door automatically establishes the shoulder belt in a restraining position about the seated occupant. A knee cushion 42 is mounted below the instrument panel 18 and is engaged by the occupant knees when the occupant moves forwardly relative the seat 12 during a vehicle deceleration condition. The occupant upper torso simultaneously moves forwardly from the seat back 16 until restrained by the shoulder belt 40. As seen in FIG. 3 the simultaneous limited forward excursion of the upper and lower torsos result in a more vertically upright or slightly reclining occupant attitude which limits the forward rotation of the head relative the steering wheel 22.

Figure 4:
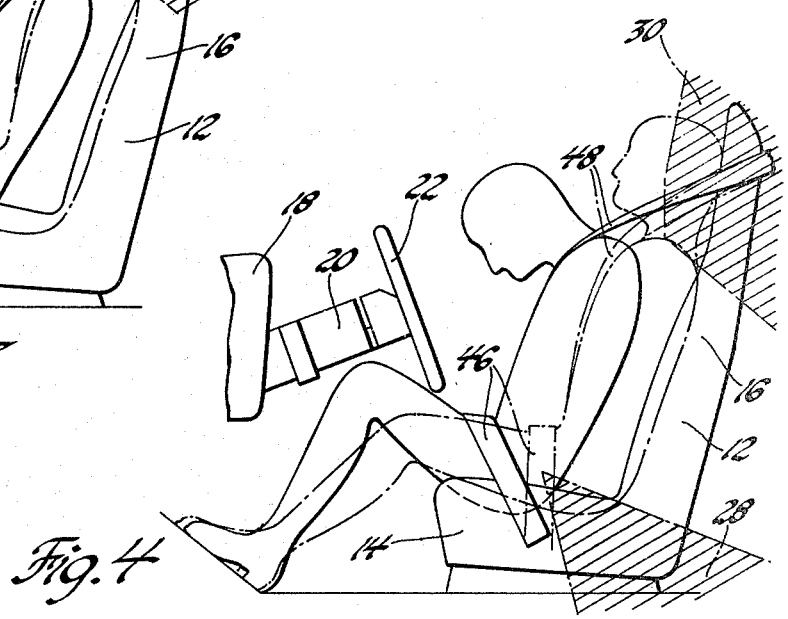
FIG. 4 shows a passive lap and shoulder belt according to the present invention, the normal occupant seating position shown in phantom line and the restrained position of the occupant shown in solid lines.

Referring to FIG. 4, a three-point passive belt system according to the present invention is comprised of lap belt 46 and a shoulder belt 48 which will be more fully discussed hereinafter with reference to FIGS. 5–8. The outboard ends of both the shoulder belt 48 and a lap belt 46 are connected to the vehicle door so that closing movement of the door automatically establishes the lap and shoulder belts in their respective restraining positions. The outboard end of the lap belt 46 is attached to the door at a point forwardly of the acceptable zone 28 specified by MVSS 210 as will be more fully described hereinafter by reference to FIGS. 5–8. Under vehicle deceleration conditions, the occupant lower torso is permitted to travel forwardly away from the seat back 16 simultaneously with the forward excursion of the upper torso. Accordingly, the occupant upper torso is maintained in a generally upright or somewhat reclining attitude similar to that obtained in the shoulder belt/knee cushion passive restraint of FIG. 3. Accordingly, the passive restraint of FIG. 4 is seen to limit the forward head rotation and excursion.

Referring to FIG. 5, the passive three-point lap and shoulder belt system of FIG. 4 is shown in greater detail. The vehicle body 54 includes a door opening 56 located laterally adjacent the occupant seat 12. A door 58 is hingedly mounted on the vehicle body 54 for swinging movement between an open position shown in FIG. 5 and a closed position. The three-point passive occupant restraint belt includes the lap belt 46 and the shoulder belt 48 which are provided by a continuous-loop of belt 62. The belt 62 has its upper end attached to the upper rear corner of the door by an anchor plate 64. The lower end of the belt 62 is connected to the lower rear corner of the door by an emergency disconnect buckle assembly 68 and a yieldable anchor strap 70 which will be discussed in greater detail hereinafter.

A control belt 74 has an inboard end which is retractably mounted by a retractor 76 suitably mounted on the vehicle body 54 inboard the occupant seat 12. The retractor 76 is preferably of the vehicle inertia sensitive type having a lockbar which is engaged with a belt windup reel by a pendulum or other inertia responsive member upon occurrence of predetermined level of vehicle deceleration.

A junction ring assembly 78 is attached to the outboard end of the control belt 74 and slidably encircles the belt 62 to define the lap belt 46 and the shoulder belt 48. Reference may be had to copending U.S. patent application Ser. No. 057,605, Lloyd W. Rogers, Jr. et al, filed July 16, 1979, for disclosure of a preferred junction ring assembly.

Referring again to FIG. 5, it will be understood that closing movement of the door swings the outboard ends of the lap belt 46 and the shoulder belt 48 inwardly and rearwardly about the occupant. The retractor 76 winds the control belt 74 to establish the junction ring assembly 78 generally adjacent the inboard occupant hip, and thereby establishes the lap and shoulder belts in their respective restraining positions.

Referring to FIGS. 6 and 7, it is seen that the resilient anchor strap 70 is attached to the vehicle door 58 by an anchor bolt 82 which is attached to the inner panel 84 of the door 58. The resilient anchor strap 70 includes a spring steel strap 86 bent to hairpin shaped configuration and having a head 88 which passes through the frame 90 of a conventional seat belt buckle 92. The parallel legs of the anchor strap 86 are captured by the head of the bolt 82. A molded plastic sleeve 93 encloses the strap 86 and buckle frame 90. A latch plate 96 connected to the outboard end of the lap belt 46 is releasably engaged within the buckle 92.

As seen in FIGS. 5, 6 and 7, the resilient anchor strap 70 establishes the lap belt 46 at a higher elevation and more forward than would result by the direct attachment of the outboard end of the lap belt 46 directly to the anchor bolt 82. This relatively high and forward position of the lap belt 46 facilitates occupant ingress and egress when the door is open.

Figure 8:
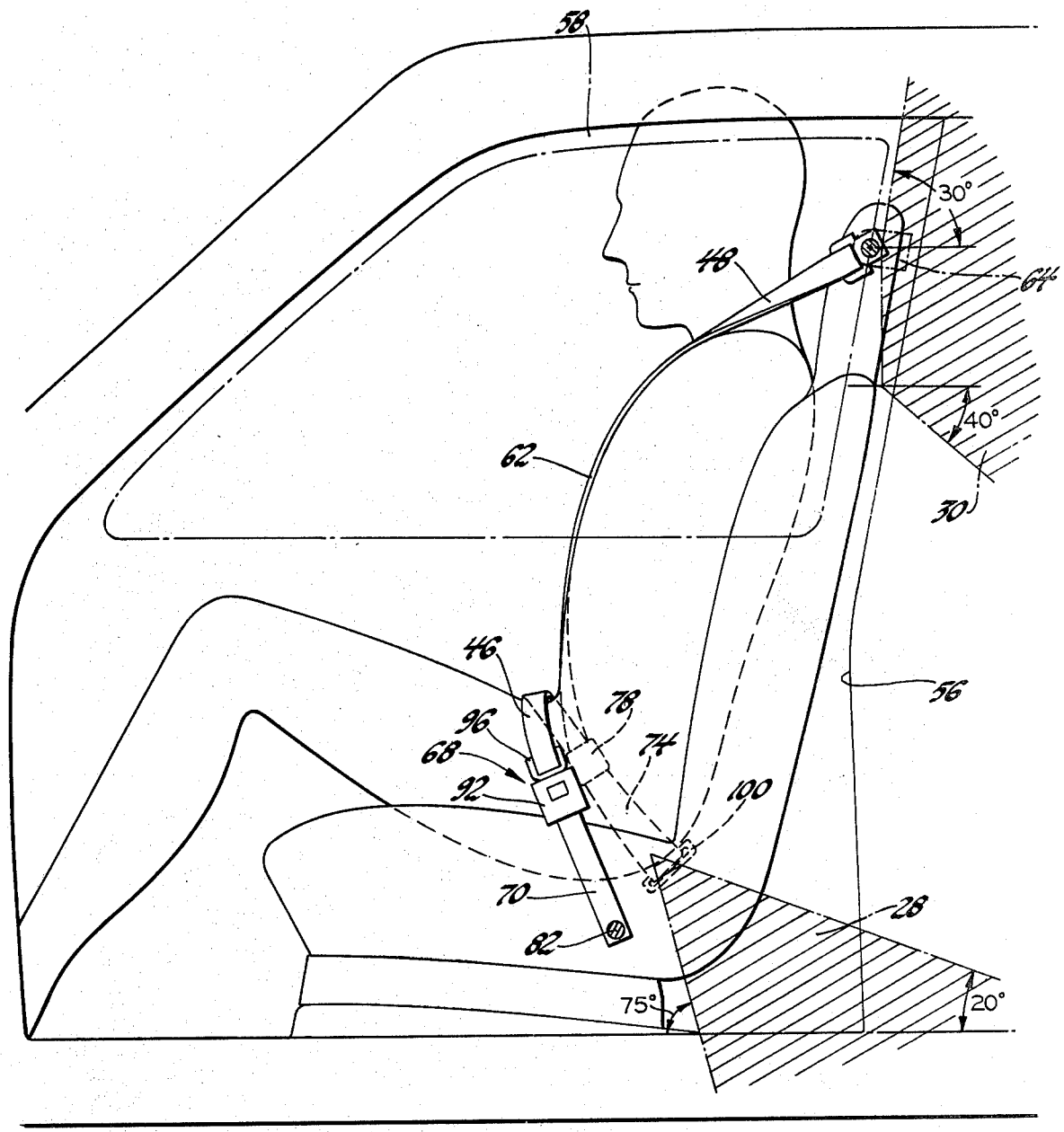
FIG. 8 is a view similar to FIG. 1 showing the MVSS 210 specified anchorage locations and showing the substantially more forward mounting location of the outboard lap belt end according to this invention.

FIG. 8 is an enlarged view similar to FIG. 4 and shows the outline of the door opening 56 of a 1980 Chevette four-door sedan relative the lap belt zone 28 and the shoulder belt zone 30 specified by MVSS 210.

With regard to the anchorage of the shoulder belt 48, it will be understood that the longitudinal location of the shoulder belt anchor plate 64 is dictated by the location of the window frame of the door 58. As seen in the drawing, the Chevette four-door sedan has a window frame which is generally coincident with the forward limit of the shoulder belt acceptable anchor zone 30.

FIG. 8 also shows the reel 100 of the retractor 76. As seen in the drawing the center line of the reel 100 which winds the anchor belt 74 is located within the zone 28. Accordingly, the inboard ends of the lap belt and the shoulder belt are anchored on the body within the zone 28. On the other hand, as seen in FIG. 8, the resilient anchor strap 70 which mounts the outboard end of the lap belt 46 on the door is located substantially forward of the zone 28 by the bolt 82.

The relatively forward anchorage of the outboard lap belt end by the resilient anchor strap 70, permits the lower torso to move forwardly away from the seatback 16 during vehicle deceleration. Imposition of occupant restraint load causes the resilient anchor strap 70 to pivot forwardly somewhat further from its position of FIG. 8 and also pivot inwardly from the position of FIG. 7. The combined forward and inward pivoting of the resilient anchor strap 70 has the effect of lengthening the lap belt somewhat to permit limited forward excursion of the lower torso away from the seatback 16. Simultaneously the restraint load imposed on the lap belt 46 and the shoulder belt 48 exerts a substantial load on the control belt 74, causing the substantial length of control belt wound on the reel 100 to tighten or spool-down and in so doing extend the effective length of the lap belt 46. The configuration of the resilient anchor strap 70 is preferably such that the lap belt outboard end will be lengthened by an amount which generally matches the increase in length at the inboard end of the lap belt as a result of the control belt spool-down. The matched increase in length of the inboard and outboard portions of the lap belt ensures simultaneous and uniform excursion of both hips in the forward direction. The effective length of the shoulder belt is also increased by the control belt spool-down and in so doing contributes to the unitary forward excursion of the upper and lower torsos as shown in FIG. 4.

It will be understood that the use of the resilient anchor strap 70 to connect the lower end of the belt 62 to the lower rear corner of the door facilitates occupant ingress and egress by establishing the lap belt 46 at a higher elevation and more forward than would result by direct attachment of the outboard end of the lap belt 46 directly to the anchor bolt 82. However, the desired occupant kinematics for optimum restraint effectiveness can be achieved without use of the yieldable anchor strap by selection of the appropriate lap belt anchorage location forward of the MVSS 210 specified zone. In this regard it will be understood that the anchorage of the lap belt forward of the MVSS 210 specified zone may be advantageously used in conjunction with other lap belt lifting and positioning devices known in the prior art.

Thus it is seen that the present invention provides a new and improved three-point door connected passive lap and shoulder belt system wherein mounting of the outboard lap belt end on the door forwardly of the limit specified by MVSS 210 improves the restraint effectiveness by preventing forward pivoting of the upper torso and maintaining the occupant upper torso in a more generally upright or rearwardly reclined position to limit forward rotation and excursion of the head. Furthermore, the present invention provides a new and improved three-point door connected passive lap and shoulder belt system wherein a resilient belt end anchor strap and the spool-down effect of the belt portion wound upon the retractor reel introduce an amount of slack into the belt system which provides limited forward excursion of the occupant in a manner which optimizes restraint performance by decelerating the occupant through the space available within the passenger compartment while at the same time limiting forward head rotation and excursion.

While this invention has been disclosed primarily in terms of the specific embodiments shown in the drawings, it is not intended to be limited to, but rather only to the extent set forth in the appended claims.

The embodiments of the invention in which an exclusive property or privilege is claimed are defined as follows:

1. In an occupant restraint system for a vehicle having a door laterally adjacent the occupant seating position, a shoulder belt having an outboard end mounted on the vehicle outboard the occupant shoulder and an inboard end, a lap belt having outboard and inboard ends, anchorage means mounting the outboard lap belt end on the vehicle door, a control belt connected to the inboard ends of the lap and shoulder belts, retractor means mounted inboard the occupant seating position and having a reel for winding the control belt when the door is closed to establish the lap belt across the lower torso and the shoulder belt diagonally across the upper torso, the imposition of occupant restraint loads on the lap and shoulder belts causing the control belt to spool-down on the reel and thereby extend the effective restraining length of the lap and shoulder belts at their inboard ends; the improvement comprising:

said anchorage means mounting the outboard lap belt end on the vehicle door being located forward of the mounting zone specified by Motor Vehicle Safety Standard 210 whereby the cooperation with control belt spool-down on the retractor reel, the occupant lower torso and upper torso are permitted limited forward excursion from the seating position in a generally upright position to limit forward rotation and excursion of the head.

2. In an occupant restraint system for a vehicle having a door laterally adjacent the occupant seating position, a shoulder belt having an outboard end mounted on the vehicle outboard the occupant shoulder and an inboard end, a lap belt having outboard and inboard ends, anchorage means mounting the outboard lap belt on the vehicle door, a control belt connected to the inboard ends of the lap and shoulder belts, retractor means mounted inboard the occupant seating position and having a reel for winding the control belt when the door is closed to establish the lap belt across the occupant hips and lower torso and the shoulder belt diagonally across the upper torso, the imposition of occupant restraint loads on the lap and shoulder belts causing the control belt to spool-down on the reel and thereby extend the effective restraining length of the lap and shoulder belts adjacent the occupant inboard hip, the improvement comprising:

said anchorage means mounting the outboard lap belt end on the vehicle door being located forward of the mounting zone specified by Motor Vehicle Safety Standard 210 at a location adapted to prevent forward pivoting movement of the upper torso by permitting limited forward excursion of the occupant outboard hip in unison with limited forward excursion of the inboard hip and upper torso permitted by control belt spool-down to thereby effectively maintain the occupant in a generally upright position and limit forward rotation and excursion of the head.

3. In an occupant restraint system for a vehicle having a door laterally adjacent the occupant seating position, a shoulder belt having an outboard end mounted on the vehicle outboard the occupant shoulder and an inboard end, a lap belt having outboard and inboard ends, anchorage means mounting the outboard lap belt end on the vehicle door, a control belt connected to the inboard ends of the lap and shoulder belts, retractor means mounted inboard the occupant seating position and having a reel for winding the control belt when the door is closed to establish the lap belt across the lower torso and the shoulder belt diagonally across the upper torso, the imposition of occupant restraint loads on the lap and shoulder belts causing the control belt to spool-down on the reel and thereby extend the effective restraining length of the lap and shoulder belts adjacent the occupant inboard hip; the improvement comprising:

said anchorage means mounting the outboard lap belt end to the vehicle door being located forward of the mounting zone specified by Motor Vehicle Safety Standard 210, and a yieldable anchor strap associated with the anchorage means and having a stiffness adequate to withstand the winding effort of the retractor to establish the lap belt in a position facilitating occupant ingress and egress when the door is open, said anchor strap yielding inwardly and forwardly under imposition of occupant restraint load to thereby extend the effective restraining length of the lap belt adjacent the outboard occupant hip to permit limited forward excursion of the occupant lower torso in cooperation with control belt spool-down and the forward location of the anchorage means to thereby prevent forward pivoting of the upper torso about the lower torso and maintain the upper torso in a generally upright position to limit forward excursion of the occupant head.

* * * * *

UNITED STATES PATENT AND TRADEMARK OFFICE
CERTIFICATE OF CORRECTION

PATENT NO. : 4,310,179

DATED : January 12, 1982

INVENTOR(S) : James A. Winnale, Lloyd W. Rogers, Jr., Edward E. Compeau, Albert E. Billis It is certified that error appears in the above-identified patent and that said Letters Patent are hereby corrected as shown below:

Column 2, line 9, after "three-point" insert -- belt --.
Column 4, line 56, delete "the" second occurrence and insert --an--.
Column 9, claim 1, line 48, delete "the" and insert -- in --.

Signed and Sealed this

First Day of June 1982

[SEAL]

Attest:

Attesting Officer

GERALD J. MOSSINGHOFF

Commissioner of Patents and Trademarks